United States Patent

Negi

Patent Number: 5,537,218
Date of Patent: Jul. 16, 1996

[54] FACSIMILE APPARATUS

[75] Inventor: Tsuneo Negi, Ayase, Japan

[73] Assignee: Canon Kabushiki Kaisha, Tokyo, Japan

[21] Appl. No.: 903,731

[22] Filed: Jun. 24, 1992

[30] Foreign Application Priority Data

Jun. 27, 1991 [JP] Japan .................. 3-156502

[51] Int. Cl.6 .................................. H04N 1/21
[52] U.S. Cl. ........................ 358/404; 358/444; 358/524
[58] Field of Search ..................... 358/400, 403, 358/404, 443, 444, 448, 500, 524, 530, 442, 296, 301

[56] References Cited

U.S. PATENT DOCUMENTS

| | | |
|---|---|---|
| 4,587,633 | 5/1986 | Wang et al. . |
| 4,719,514 | 1/1988 | Kurahayashi et al. . |
| 4,772,955 | 9/1988 | Kurahayashi et al. . |
| 4,789,900 | 12/1988 | Takahashi . |
| 4,814,890 | 3/1989 | Kato . |
| 4,827,349 | 5/1989 | Ogata et al. . |
| 4,845,569 | 7/1989 | Kurahayashi et al. . |
| 4,900,902 | 2/1990 | Sakakibara . |
| 4,922,349 | 5/1990 | Abe et al. . |
| 5,129,061 | 7/1992 | Wang et al. . |
| 5,148,293 | 9/1992 | Miyachi ............................ 358/444 |
| 5,170,266 | 12/1992 | Marsh et al. ..................... 358/468 |
| 5,223,948 | 6/1993 | Sakurai et al. ................... 358/404 |
| 5,231,514 | 7/1993 | Nakamura ........................ 358/444 |
| 5,241,672 | 8/1993 | Slomcenski et al. ............. 395/500 |
| 5,251,308 | 10/1993 | Frank et al. ..................... 395/425 |
| 5,258,853 | 11/1993 | Nobuta et al. ................... 358/444 |
| 5,263,152 | 11/1993 | Smith et al. ..................... 395/575 |
| 5,267,048 | 11/1993 | Hirai ................................ 358/404 |
| 5,283,667 | 2/1994 | Kojima et al. ................... 358/462 |
| 5,309,251 | 5/1994 | Terajima .......................... 358/444 |

*Primary Examiner*—Bentsu Ro
*Attorney, Agent, or Firm*—Fitzpatrick, Cella, Harper & Scinto

[57] ABSTRACT

In a facsimile apparatus, an image to be transmitted is stored in a first memory and the stored image is transferred to and stored in a second memory, which is capable of being loaded to and unloaded from the facsimile apparatus. This processing is executed if certain conditions such as time are satisfied, and if the second memory has been loaded. After the transfer of the image data, the status of storage in each of the first and second memories is managed. In a case where the transmitted image that has been stored in the second memory is to be transferred to the first memory, a necessary condition is that the image stored in the loaded second memory coincide with the contents of the managed status of storage.

19 Claims, 6 Drawing Sheets

FACSIMILE APPARATUS

BACKGROUND OF THE INVENTION

1. Field of the Invention

This invention relates to a facsimile apparatus, such as a facsimile apparatus having a memory.

2. Prior Art

In a facsimile apparatus of this kind, mainly a volatile semiconductor memory is used as the memory medium for storing image information since such a memory is low in cost and occupies little space. Application of the volatile semiconductor memory is limited to temporary storage of the image information of a document when the document is to be transmitted from memory at the time of a transmission, and to temporary storage of received image information in an intercepting mode when recording paper runs out at the time of reception.

In transmission from memory, the image information to be transmitted is first stored in the memory medium and an outgoing call is placed to a designated party. When a transmitting machine completes the transmission of the image to the designated party, the transmitting machine erases the transmitted image information that has been stored on the memory medium. In a case where a call is placed to a designated party but the image information for transmission cannot be sent to the designated party correctly because the party is busy or the line is faulty, the transmitting machine outputs a non-delivery message as well as a non-delivery transmission image as a warning to notify the operator. At this time, whether the image information for transmission stored in the memory medium is to be left in the memory medium or erased usually is selected by the operator.

When, in the interception mode, the recording paper in the receiving machine runs out in the course of reception or is absent from the start of reception, the receiving machine stores the incoming image information on the memory medium from the moment the recording paper runs out or from the start of reception. When the storage of the received image ends, the receiving machine notifies the operator, by visual or audio means, of the fact that interception has been performed. When the operator replenishes the receiving machine with recording paper, the receiving machine begins printing the image information, which has been received by interception, on the recording paper. At the end of printing of all information, the receiving machine erases the received image information that has been stored on the memory medium.

However, in the example of the prior art described above, the semiconductor memory incorporated within the facsimile apparatus has a limited memory capacity. As a consequence, a problem which arises is that the operator cannot store the image information of a transmission document in the memory as duplicate of transmission in order to maintain the performance of transmission from memory and interception.

SUMMARY OF THE INVENTION

An object of the present invention is to provide a facsimile apparatus capable of eliminating the aforesaid problem encountered in the prior art.

Another object of the present invention is to provide a facsimile apparatus in which an operation for transferring image information from a first memory medium to a second memory medium is capable of being controlled by a button on a control panel or by a timer.

A further object of the present invention is to provide a facsimile apparatus in which an operator is capable of readily leaving a duplicate of a transmitted document so that re-transmission of the document can be assured by the duplicate when a problem develops during facsimile communication.

Still another object of the present invention is to provide a facsimile apparatus in which document back-up can be achieved by a duplicate of a transmitted document when a problem develops during facsimile communication.

Yet another object of the present invention is to provide a facsimile apparatus comprising a plurality of memory means for storing a transmission image, and transfer means for transferring the transmission image, which has been stored in one of the plurality of memory means, to another one of the memory means.

Yet another object of the present invention is to provide a facsimile apparatus comprising first memory means for storing data, second memory means for storing data, managing means for managing storage states of the first and second memory means, and transfer means for performing a data transfer between the first and second memory means in accordance with each storage state managed by the managing means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

The facsimile apparatus of this embodiment to which the present invention is applied is a communication apparatus which stores image information in a memory medium having a high recording speed, and transfers the image information to a non-volatile memory medium having a comparatively low recording speed. In particular, when the facsimile apparatus is used as a transmitting machine, the image information of the document to be transmitted is stored in the comparatively slow memory medium as a duplicate of transmission.

Figure 1:
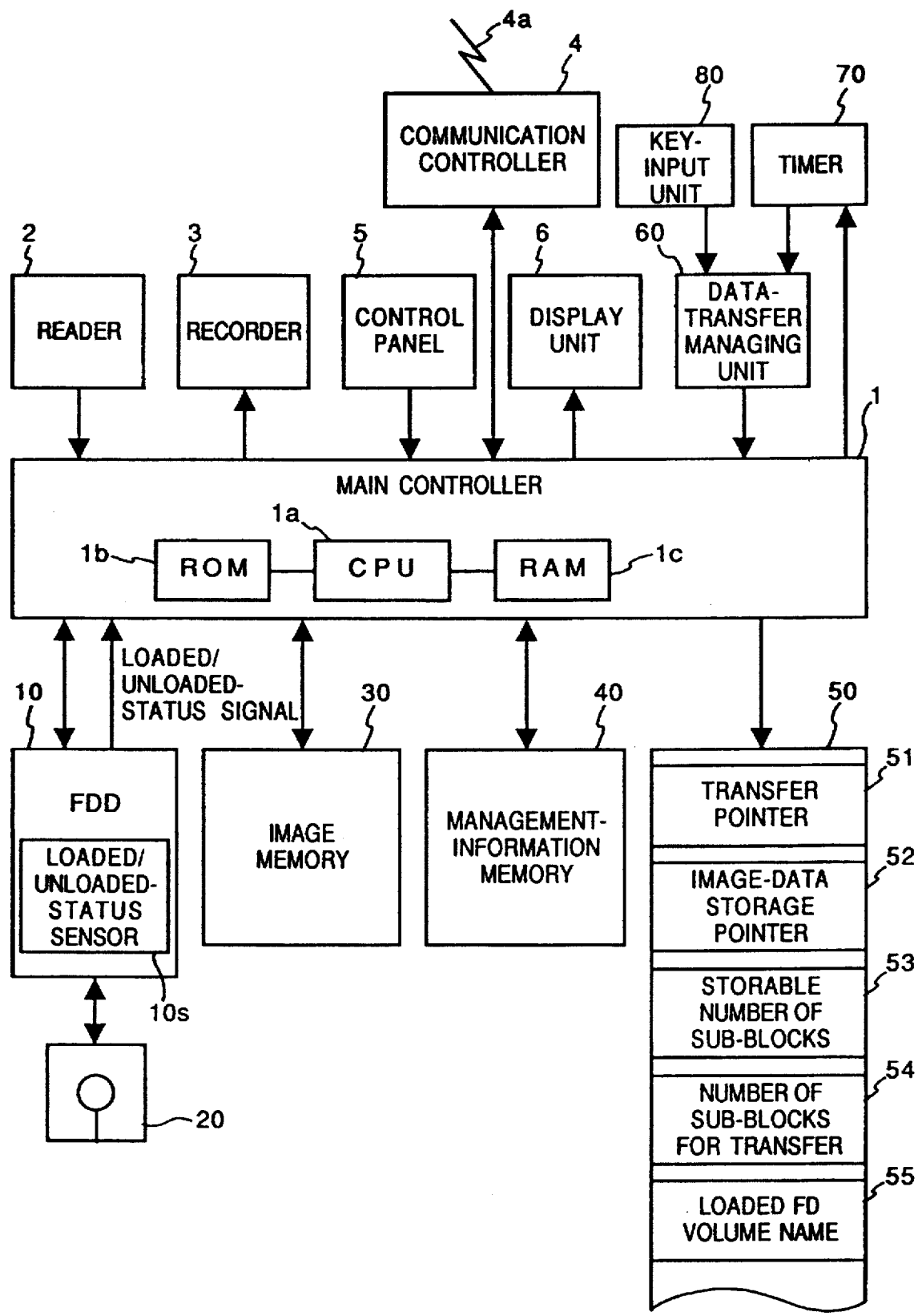
FIG. 1 is a block diagram illustrating an embodiment of a facsimile apparatus according to the present invention.

FIG. 1 is a block diagram illustrating an embodiment of the facsimile apparatus according to the invention. The apparatus includes a main controller 1 for controlling the overall operation of the apparatus. The main controller 1 comprises a microprocessor (hereinafter referred to as a "CPU") 1a for controlling the overall operation, a program-memory ROM (hereinafter referred to as a "RAM") 1b, and a work-area RAM (hereinafter referred to as a "RAM") 1c. The apparatus further includes a reader 2 constituted by a CCD image sensor, a document conveyance mechanism and the like, and a recorder 3 constituted by a thermosensitive printer, laser printer or the like.

A communication controller 4 connected to the main controller is constituted by a modem, NCU (network control unit), etc., and performs communication with a network via a line 4a. A control panel 5 connected to the connected to the main controller is constituted by a keyboard or the like. A display unit 6 comprises an LCD or the like. Numeral 10 denotes a floppy-disk driver (hereinafter referred to as an "FDD"), 20 a floppy disk (hereinafter referred to as an "FD"), 30 a memory (hereinafter referred to as an "image memory"), such as a D-RAM, for storing image data, 40 a memory (hereinafter referred to as a "management-information memory"), such as an S-RAM, for storing image-management information, 50 a control-data memory such as an S-RAM, 60 a data-transfer management unit for allowing a transfer of data between memories, 70 a timer and 80 a key-input unit controlled by the operator.

Figure 2:
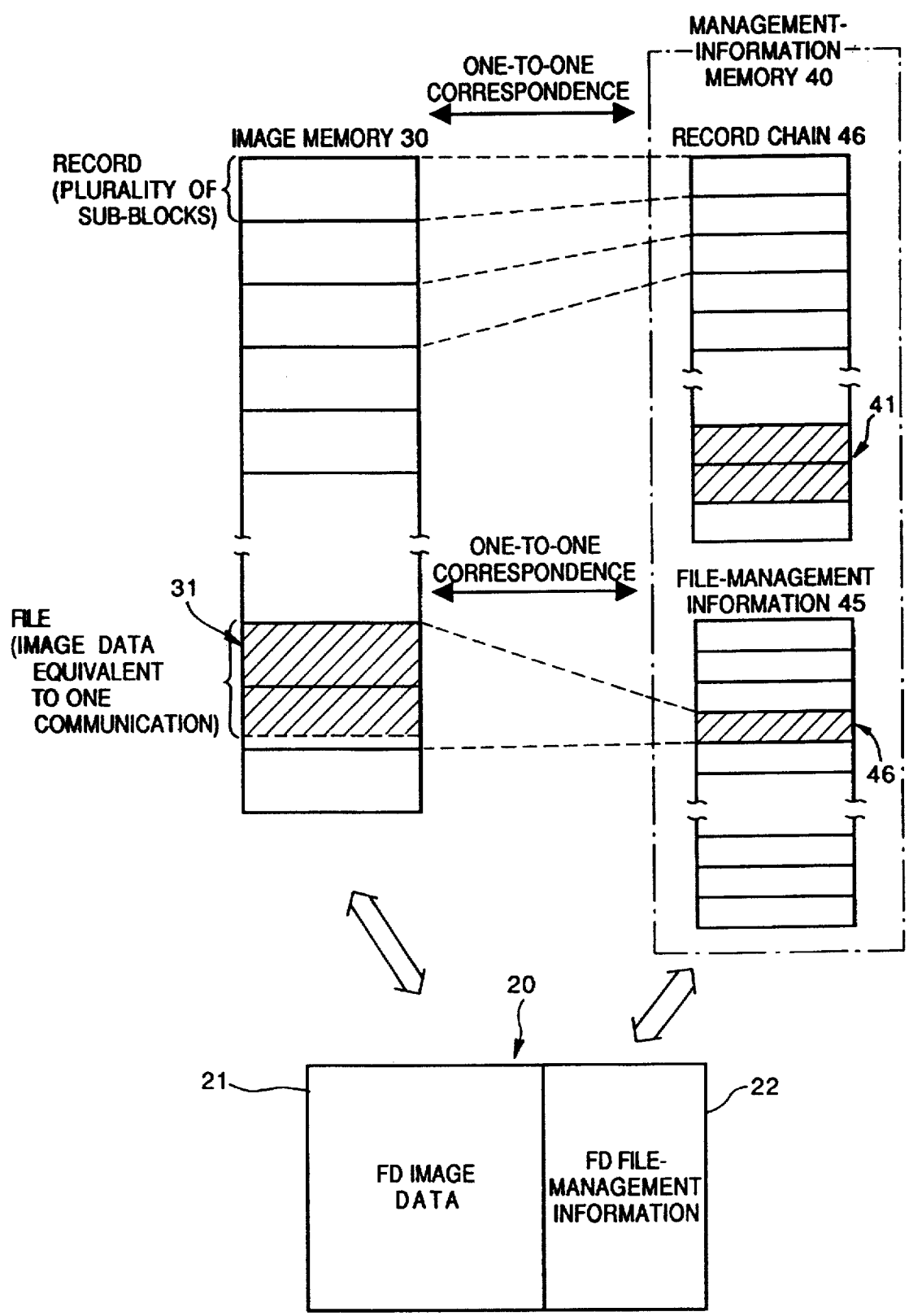
FIG. 2 is a diagram showing the relationship between memories in the facsimile apparatus of FIG. 1.

FIG. 2 illustrates the relationship between the memories in the facsimile apparatus of FIG. 1.

The image memory 30 is a memory medium for storing image data 31 and is an example of a first memory medium. The image memory 30 is composed of a plurality of main blocks (records) of a predetermined size, and each main block is composed of a plurality of sub-blocks of a predetermined size. A first page of one transmission of image data (equal to one file) is stored in a main block from the beginning thereof (i.e., from the beginning of sub-block number 0). Each page within a file is stored from the beginning of a sub-block. Further, a transfer of data with the FD 20 is carried out in sub-block units.

The management-information memory 40 is a memory medium for storing image-management data 41, which is for management of the image data 31. The image-management data 41 contains file-management information 45 for managing each file, and a record chain 46 for managing each record of the image memory 30.

The file-management information 45 stores the state of use of files in the image memory 30 and FD 20, the storage starting and end positions (the block number in the image memory 30 or the FAT number in the FD 20) of each page in a file, the name (hereinafter referred to as the "volume name") assigned to the FD 20 in which the image data has been stored, and the names of the files within the FD 20.

The record chain 46 stores, in correspondence with each record within the image memory 30, the state of use of each record, whether or not there is a next record, the number of the next record, etc.

The FD 20 is a memory medium for storing FD image data 21, and FD file-management information 22, which is for management of the FD image data 21. This is an example of a second memory medium. An area for storing the FD file-management information 22 is secured within the FD 20 in addition to an area for storing the FD image data 21. The items of FD file-management information 22 are updated based upon the file-management information 45 whenever there is a change made in the contents of the FD 20.

The FDD 10 has a loaded/unloaded-status sensor 10s for sensing the loaded/unloaded state of the FD 20 and generating a signal indicative of the loaded/unloaded state. The main controller 1 determines whether the FD 20 has been loaded or unloaded based upon the signal generated by the sensor 10s.

The control-data memory 50 stores a transfer pointer 51, an image-data storage pointer 52, a number 53 of sub-blocks capable of being stored, a number 54 of sub-blocks for transfer, and a volume name 55 of a loaded FD.

The transfer pointer 51 is used when a transfer is made from the image memory 30 to the FD 20. The transfer pointer 51 indicates a sub-block presently undergoing transfer or awaiting transfer within the image memory 30. When transfer of this sub-block ends, the pointer is updated to the next sub-block.

The image-data storage pointer 52 indicates the next address of the final address of the image data 31 presently being stored in the image memory 30, namely the address at which image data 31 is to be stored next. Dummy data is entered here at times other than when storage is being carried out.

The FD 20 has an area (from which the area for storing the FD file-management information is excluded beforehand, as mentioned above) capable of being used for storage of the FD image data 21. The number 53 of sub-blocks capable of being stored in the FD 20 is obtained by dividing the unused area of the FD 20 by the size of the sub-blocks. In case of an FD in, say, the MS-DOS (the registered trademark of Microsoft, Inc.) format, which is one type of operating system, the number of storable sub-blocks is calculated from a file allocation table (FAT), which is a part of management information. A FAT is a table in which the storage area of the FD 20 is divided into blocks of certain units in order to store the status of use of each unit block as well as the unit-block numbers. The number 53 of storable sub-blocks is updated when there is a change in the contents of the FD 20 due to storage of an image transmitted from the facsimile memory or erasure of an image from memory, or when there is a change in the FD due to insertion or ejection of the FD.

The number 54 of blocks for transfer represents the number of sub-blocks of image data 31 currently stored in the image memory 30 that are to be transferred to the FD 20. This number is increased whenever a sub-block is updated while image data is stored in the image memory 30. In other words, it indicates how many sub-blocks of the image data 31 have been stored.

The volume name 55 is the volume name of the FD 20 that has been loaded. This is updated when the FD 20 is inserted.

The operation of the facsimile apparatus shown in FIG. 1 will now be described with reference to FIGS. 3 through 6.

Figure 3:
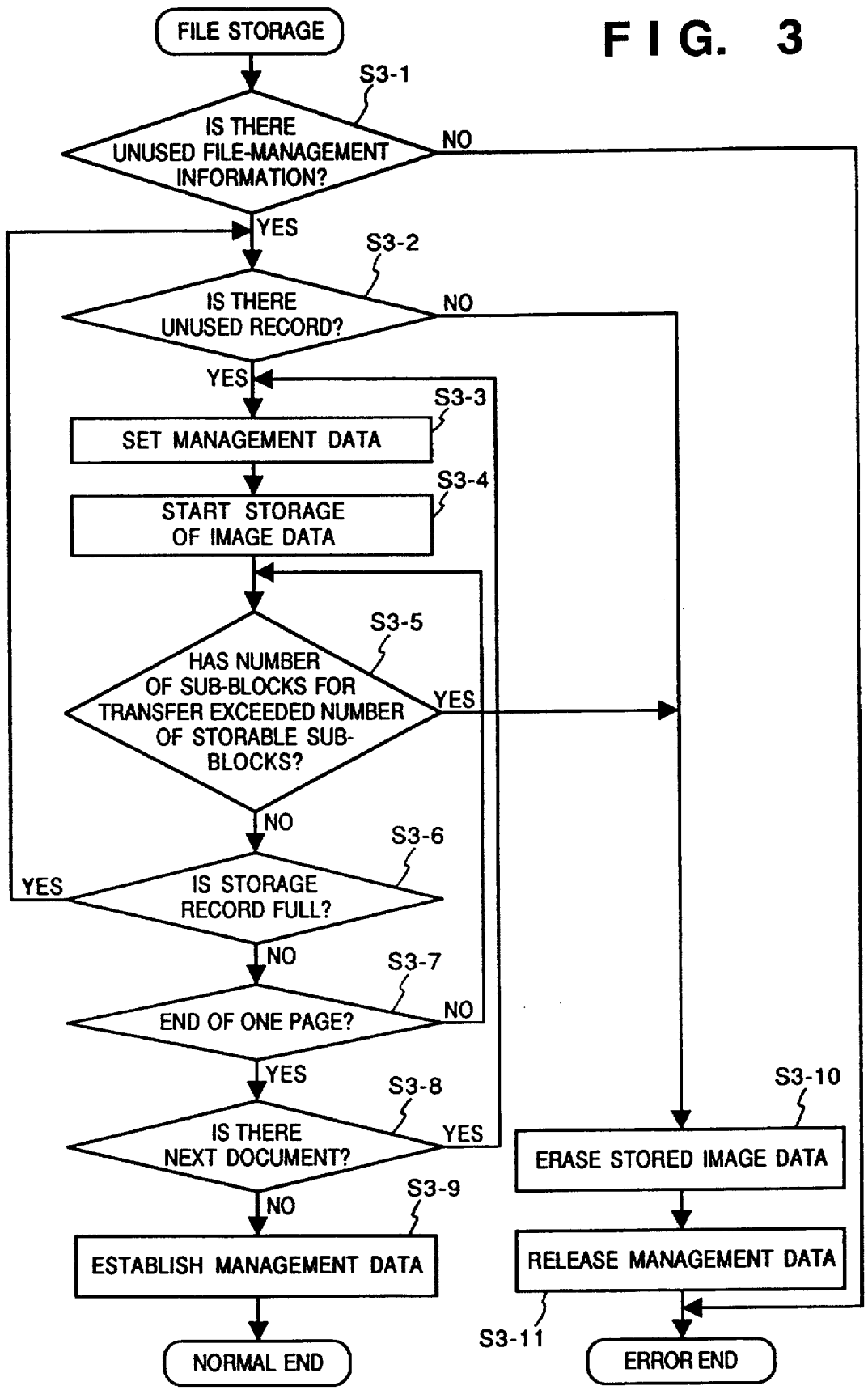
FIG. 3 is a flowchart for describing a file storing procedure according to this embodiment.

FIG. 3 is a flowchart for describing the procedure through which a document to be transmitted is stored in the image memory 30 and one file of image data 31 is generated in the facsimile apparatus of FIG. 1.

At step S3-1 in FIG. 3, reference is made to the file-management information 45 to determine whether there is unused file-management information. If there is no unused file-management information, the program proceeds to error-end processing; otherwise, reference is made to the record chain 46 to determine at step S3-2 whether there is an unused record. If there is no unused record, this means that the image memory 30 is full; otherwise, the program proceeds to step S3—3, where the starting address of this record is set in the image-data storage pointer 52. In addition, a value indicating the storage starting position in the file-management information 45, a value indicating the status of use of the pertinent record in the record chain 46, etc., are set in the image-management data 41 at step S3-3.

When the storage (of one record) of the image data 31 ends at step S3-4, the image-data storage pointer 52 is updated in concurrence with the storage operation and, in addition, the number 54 of sub-blocks for transfer is updated whenever a sub-block is updated. It is determined at step S3-5 whether the number 54 of sub-blocks for transfer has exceeded the number 53 of storage sub-blocks. If the number 54 of sub-blocks for transfer has not exceeded the number 53 of storage sub-blocks, then it is determined at step S3-6 whether the record currently being stored is filled with image data. If the result of the determination is that the record is not full, then it is determined at step S3-7 whether one page of the document has ended. If one page of the document has not ended, then the program returns from step S3-7 to step S3-5 and storage of data continues. If the determination at step S3-7 is that one page has ended, it is determined a step S3-8 whether there is an ensuing document. If there is an ensuing document, the program returns to step S3-3 and the page information in the file-management information 45 is updated; if there is no ensuing document, the program proceeds to step S3-9, at which a validation flag and the position at which storage ends, etc., in the image memory are set in the file-management information 45. Storage is then ended normally. Further, the number 53 of storage sub-blocks is set and the number 54 of sub-blocks for transfer is cleared.

When it is found at step S3-2 that there are no unused records and the image memory 30 is full, or when it is found at step S3-5 that the number 54 of sub-blocks for transfer has exceeded the number 53 of storable sub-blocks, the stored image data 31 is erased at step S3-10 based upon the file-management information 45 and record chain 46. Thereafter, the pertinent file-management information 45 and record chain 46 are released at step S3-11, the number 54 of sub-blocks for transfer is cleared and the program proceeds to error-end processing.

The determination made at step S3-7 regarding the end of one page of a document is implemented using, say, a sensor which senses the trailing edge of the document, and depends upon whether the reading of one page has ended. The determination made at step S3-8 regarding whether there is an ensuing document is implemented using, say, a sensor which senses the leading edge of the document. In case of error-end processing, the operator is notified through the display unit 6 of the fact that data could not be stored.

Figure 4:
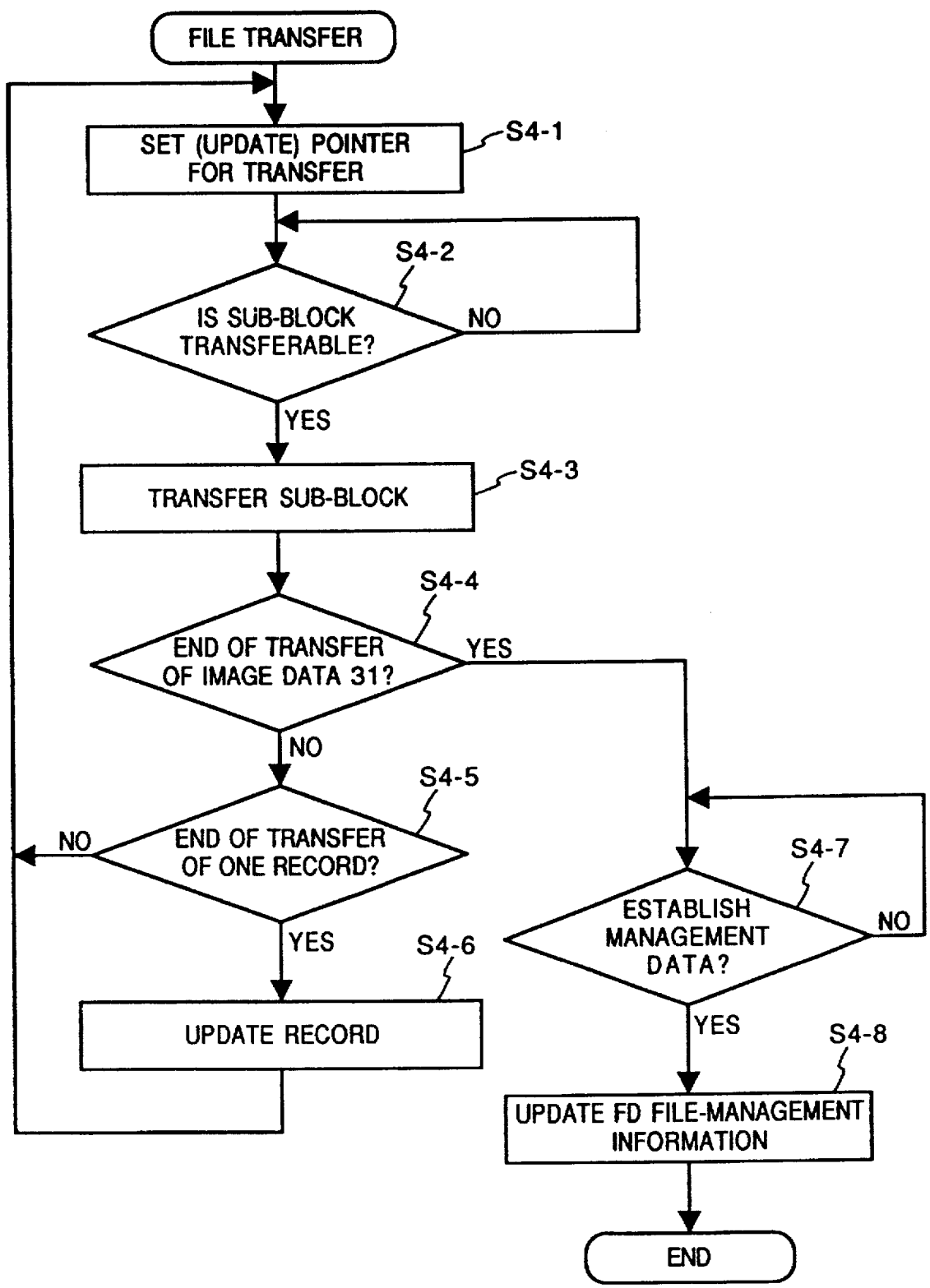
FIG.4 is a flowchart for describing a file transfer procedure according to this embodiment.

FIG. 4 is a flowchart for describing the procedure through which the data-transfer management unit 60 transfers one file of image data from the image memory 30 to the FD 20 as a duplicate of a transmitted image in response to an output from the key-input unit operated by the operator or an output from the timer 70, which manages starting and end times registered beforehand in the work-area RAM contained in the main controller 1.

First, the starting sub-block of a starting record of a file desired to be transferred is set in the transfer pointer 51 at step S4-1. Next, if the sub-block indicated by the transfer pointer 51 is found to be capable of being transferred at step S4-2, then sub-block transfer of image data from the image memory 30 to the FD 20 is carried out at step S4-3. A sub-block is judged to be transferable at step 4-2 when the image-data storage pointer 52 is dummy data indicating that storage is not in progress, or when there is no image-data storage pointer 52 in the sub-block indicated by the transfer pointer 51.

After the transfer of the sub-block, it is determined at step S4-4 whether the transfer of the image data 31 to be transferred has ended. This determination is made based upon whether the final record and final sub-block stored in the image data 31 indicated by the file-management information 45 and record chain 46 coincide with the sub-block transferred immediately before. If the transfer of the image data 31 to be transferred has not ended, it is determined at step S4-5 whether all of the data of one record has been transferred. This determination is made based upon whether the sub-block just transferred is the final sub-block in the record. If all of the data in one record has been transferred, then an update to the next record is performed at step 4-6 upon referring to the record chain 46. The processing then returns to step 4-1 and the starting sub-block of this record is set in the transfer pointer 51. If data remains in the record, processing returns to step 4-1 and the transfer pointer 51 is updated.

If the transfer of image data 31 has ended at step S4-4, an FD validation flag, the volume name of the FD 20, the file name and other information in the file-management information 45 are set. The system waits at step S4-7 until the image-management data 41 is established. When the data 41 has been established, the file-management information 22 in the FD 20 is updated based upon the file-management information 45 at step S4-8, after which processing for transferring the image data 31 ends.

When the image data 31 is transmitted to the facsimile apparatus of the receiving party by the communication controller 31, the image data 31 that has been stored is erased based upon the pertinent file information and record chain 46, after which the pertinent record chain 46 is released and the file validation flag of image memory 30 in the pertinent file information is cleared.

Figure 5:
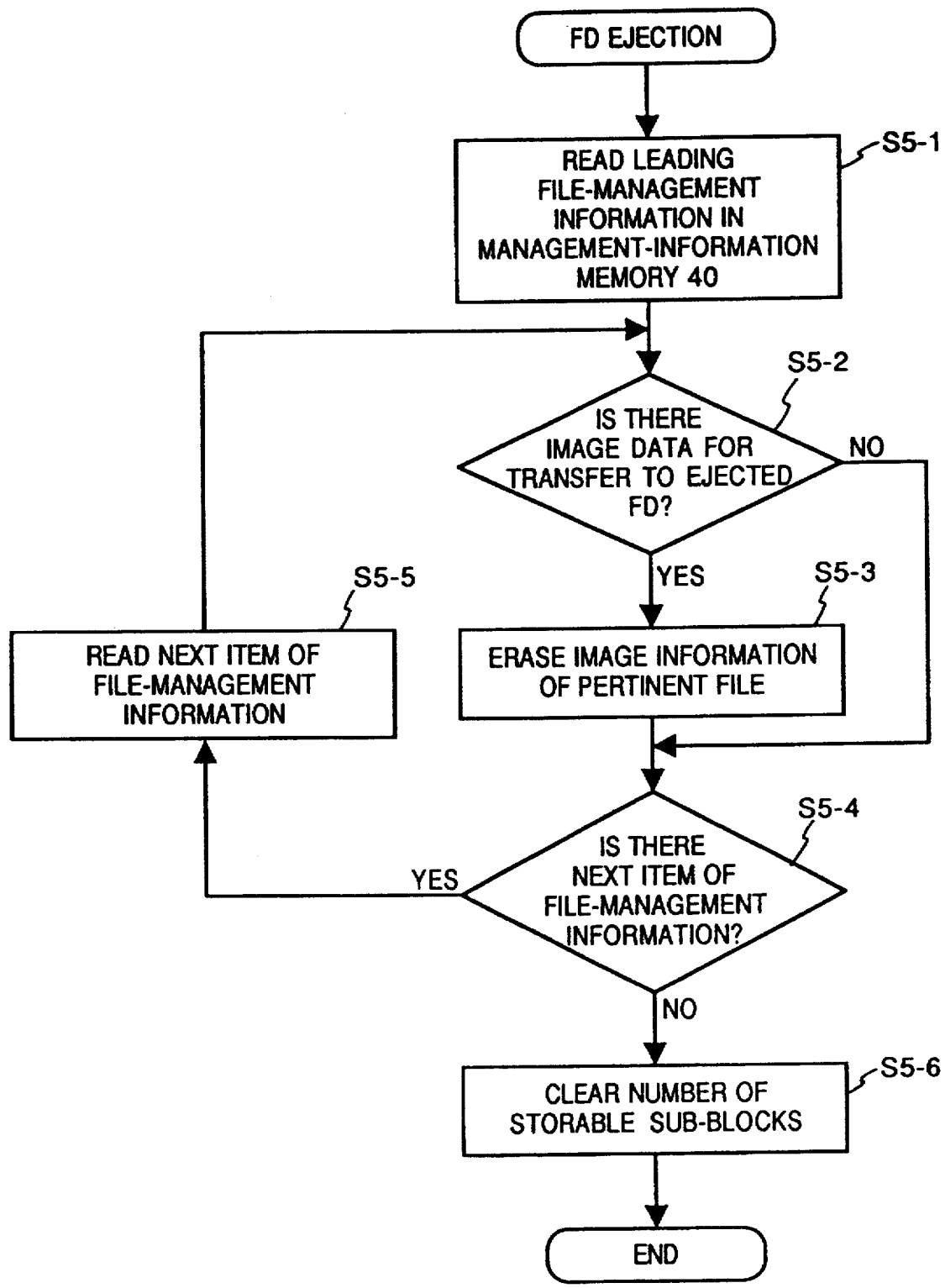
FIG. 5 is a flowchart for describing a floppy-disk ejecting procedure according to this embodiment.

FIG. 5 is a flowchart for a case where the FD 20 is ejected from the main body of the facsimile apparatus of FIG. 1 as a duplicate of an image whose transmission has been completed.

When it has been determined based upon the signal from the loaded/unloaded-status sensor 10s that the FD 20 has been ejected, the leading item of file-management information is read from the file-management information 45 at step S5-1. Next, it is determined at step S5-2 whether the image data 31 of this file-management information (hereinafter referred to as the "pertinent file information") has been transferred to the ejected FD 20. Specifically, the image data 31 is judged to have been transferred to the FD 20 if the FD validation flag in the pertinent file information has been set and the FD volume name stored in the pertinent file information agrees with volume name 50 of the loaded FD. The stored image data 31 is erased based upon the pertinent file information and the record chain 46 only if the image data has been transferred, after which the pertinent record chain 46 is released and the file validation flag of the image memory 30 contained in the pertinent file information is cleared at step S5-3.

Next, it is determined at step 5-4 whether file management information follows the file-management information 45. If the answer is YES, then the next item of file-management information is read at step S5-5 and the program returns to step S5-2. If it is determined that there is no next item of file-management information, the number 53 of storable sub-blocks is cleared to zero at step S5-6 and ejection processing is terminated.

Figure 6:
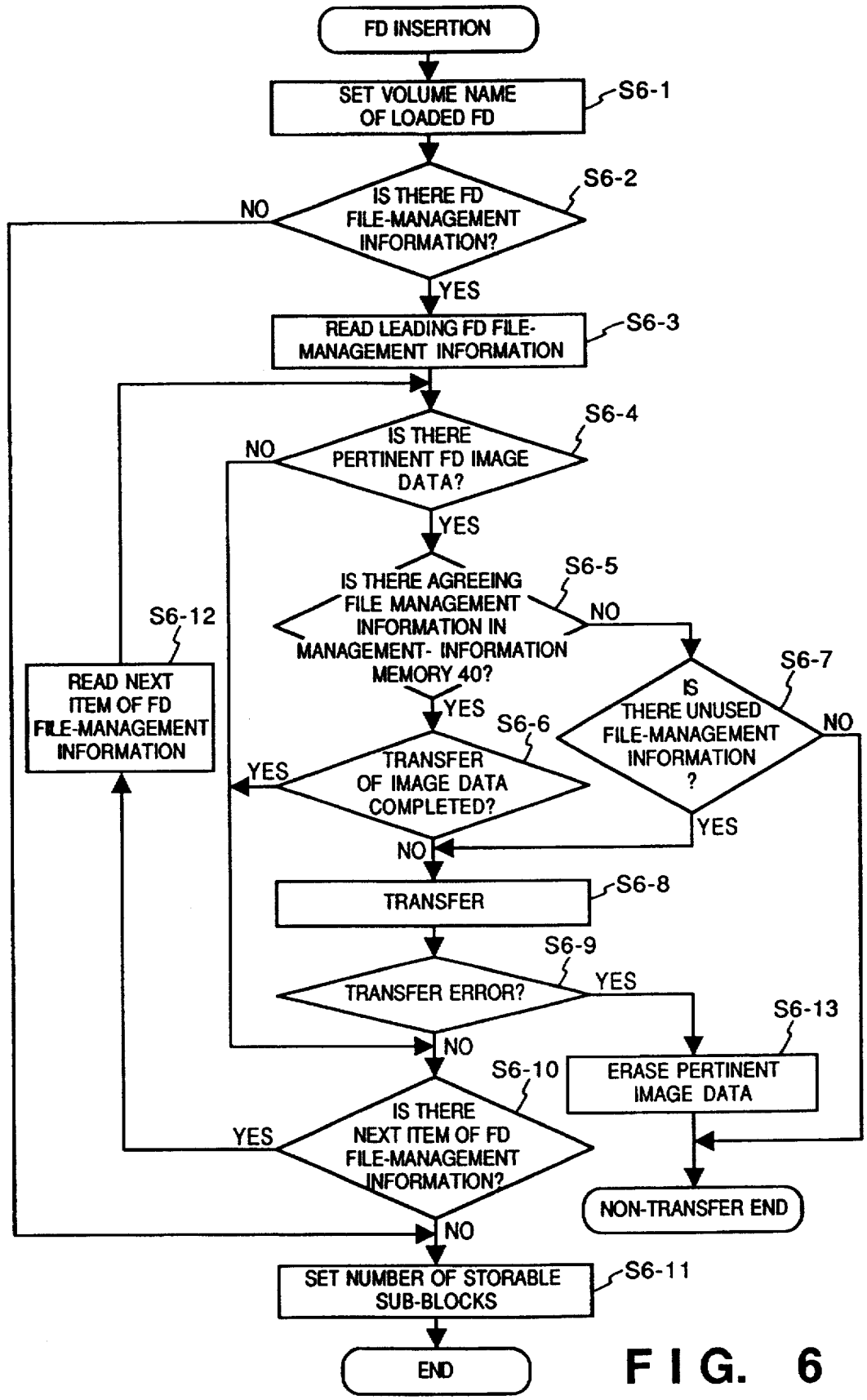
FIG. 6 is a flowchart for describing a floppy-disk inserting procedure according to this embodiment.

FIG. 6 is a flowchart illustrating processing in the facsimile apparatus of FIG. 1 for a case where the FD 20 has been inserted into the facsimile apparatus in order to verify the contents of the document serving as the transmission duplicate stored in the FD 20. It is assumed here that the inserted FD 20 has already been formatted so that data is capable of being read and written.

When it has been determined based upon the signal from the sensor 10s that the FD 20 has been inserted, a non-transfer flag within the control-data memory 50 is set and the volume name of the FD 20 is stored in the volume name 55 of the loaded FD at step S6-1. Next, it is determined at step S6-2 whether there is FD file-management information 22. If the information 22 is absent, the program proceeds to step S6-11. If the information 22 is present, the leading FD file-management information in the FD file-management information 22 is read at step S6-3. Next, it is determined at step S6-4 whether the FD image data 21 of this FD file-management information (hereinafter referred to as "pertinent FD file information") is present in the inserted FD 20. Specifically, it is judged that the FD image data 21 is contained in the FD 20 if the FD validation flag in the pertinent FD file information has been set and the FD volume name stored in the pertinent FD file information agrees with the volume name 55 of the loaded FD. If the FD image data 21 is absent, the program proceeds to step S6-9.

If the FD image data 21 is present, it is determined at step S6-5 whether file-management information agreeing with the pertinent FD file information exists in the file-management information 45. If agreeing file-management information is present, then it is determined at step S6-6 whether the agreeing file-management information has already been transferred to the image memory 30. This determination is made based upon whether the file validation flag of image memory 30 in the file-management information 45 has been set or not. The program proceeds to step S6-8 if the agreeing file-management information has not been transferred and to step S6-10 if it has been transferred. If it is found at step S6-5 that there is no agreeing file-management information, reference is made to the file-management information 45 to determine at step S6-7 whether there is unused file-management information. If there is unused file-management information, the program proceeds to step S6-8; otherwise, the program proceeds to non-transfer end processing.

At transfer from the FD 20 to the image memory 30 at step S6-8 involves successively reading the FD image data 21 in accordance with the FD file-management information 22 and FAT information, transferring the data in sub-block units and storing it in the image memory 30. The storage of data in the image memory 30 is carried out in the same manner as described in connection with steps S3-2 to S3-9 in FIG. 3. The FD validation flag also is set along with the file validation flag of image memory 30 in the file-management information 45 at step S3-9. In a case where there is no unused record and the image memory 30 is full at step S3-2, a transfer error is determined to have occurred at step S6-9 and the image data of the file is erased at step S6-13, after which the program proceeds to non-transfer end processing.

If there is no transfer error at step S-9, it is determined at step S6-10 whether there is an item of FD file-management information following the FD file-management information 22. If there is a subsequent item of FD file-management information, the next item of this information is read at step S6-12 and the program returns to step S6-4. If there is no subsequent item of this information, then the number 53 of storable sub-blocks is outputted from the FAT and set at step S6-11. The non-transfer flag is cleared and insertion processing ends.

If it is found at step S6-7 that there is no unused file-management information, or if transfer error is judged to have occurred at step S6-9, then processing proceeds to non-transfer end, with the non-transfer flag being left in the set state. If unused file-management information or an unused record comes into existence after some sort of processing while the non-transfer flag is in the set state, the processing from step S6-4 onward is executed with respect un-transferred file. The image of the duplicate transmission stored in the image memory 30 is recorded by the recorder 3.

Processing for a case where the image information in the FD 20 is erased in the facsimile apparatus of FIG. 1 will now be described.

First, the file name, in FD 20, of the file that has been stored in the file-management information 45 but that is desired to be erased is stored in the control-data memory 50. Next, the FD file-management information 22 is updated based upon the file-management information 45, and the FD image-data 21 is erased based upon the file name just stored. Finally, the number of sub-blocks of erased FD image 21 is added to the number 53 of storable sub-blocks, after which erasure processing is ended.

Thus, in accordance with the embodiment as described above, an operation for transferring image information from the image memory 30 serving as a first memory medium to the FD 20 serving as a second memory medium is capable of being controlled by a button on a control panel or by a timer, thereby making it possible for the operator to readily leave a duplicate of a transmitted document in the FD 20. As a result, retransmission of the document can be assured by the duplicate when a problem develops during facsimile communication. Alternatively, the duplicate can be utilized as a back-up.

An input to the data-transfer management unit 60 can be a specific destination for a transmission, a specific region, a specific sender or a specific recipient.

It should be noted that the present invention may be applied to a system constituted by a plurality of apparatus or to a single apparatus. Further, it goes without saying that the invention is applicable also to a case where a program for implementing the invention is supplied to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
 a plurality of memory means for storing image data files, said plurality of memory means including at least a semiconductor memory for storing a first plurality of image data files and a non-volatile memory for storing a second plurality of image data files;
 loading/unloading means for loading said non-volatile memory in and unloading said non-volatile memory from said facsimile apparatus; and
 transfer means for transferring a transmission image data file previously stored in said semiconductor memory to said non-volatile memory,
 wherein said transfer means has managing means for managing the transfer of the transmission image data file in accordance with first file information separate from the first plurality of image data files and stored in said semiconductor memory, said managing means further managing the transfer in accordance with second file information, different from the first file information, separate from the second plurality of image data files and stored in said non-volatile memory.

2. The apparatus according to claim 1, further comprising detecting means for detecting a loaded/unloaded state of said loading/unloading means, wherein said transfer means performs a data transfer if the loaded state is detected by said detecting means.

3. The apparatus according to claim 2, wherein said transfer means verifies that predetermined conditions have been satisfied and performs a data transfer from said semiconductor memory to said non-volatile memory if the loaded state is detected by said detecting means and a predetermined time has arrived, and verifies that said predetermined condition have been satisfied and performs a data transfer from said non-volatile memory to said semiconductor memory if the loaded state is detected by said detecting means and said managing means is currently managing the second file information.

4. The apparatus according to claim 1, further comprising updating means for updating each of the file information managed by said managing means in concurrence with execution of a data transfer by said transfer means.

5. A facsimile apparatus comprising:

a plurality of memory means for storing a transmision image, said plurality of memory means including at least semiconductor memory and a non-volatile memory;

loading/unloading means for loading said non-volatile memory in and unloading said non-volatile memory from said facsimile apparatus;

transfer means for transferring the transmission image, which has been stored in one of said plurality of memory means, to another one of said memory means; and detecting means for detecting a loaded/unloaded state of said loading/unloading means, wherein said transfer means has managing means for managing file information relating to file data stored in each of said semiconductor memory and said non-volatile memory, verifies that predetermined conditions have been satisfied and performs a data transfer from said semiconductor memory to said non-volatile memory if the loaded state is detected by said detecting means and a predetermined time has arrived, verifies that said predetermined conditions have been satisfied and performs a data transfer from said non-volatile memory to said semiconductor memory if the loaded state is detected by said detecting means and information managed by said managing means corresponds to said non-volatile memory, an wherein said transfer means has a timer and determination means for determining, based upon said timer, whether the predetermined time has arrived.

6. A facsimile apparatus comprising:

first memory means for storing a first plurality of image data files;

second memory means for storing a second plurality of image data files;

managing means for managing the first plurality of image data files by using first file information separate from the first plurality of image files and stored in said first memory means and for managing the second plurality of image data files by using second file information different from the first file information, separate from the second plurality of image files and stored in said second memory means; and transfer means for performing a data transfer of an image data file between said first and second memory means in accordance with the first and second file information.

7. The apparatus according to claim 6, wherein said first memory means has a semiconductor memory and said second memory means has a non-volatile memory.

8. The apparatus according to claim 7, further comprising:

loading/unloading means for loading said non-volatile memory in and unloading said non-volatile memory from said facsimile apparatus; and detecting means for detecting a loaded/unloaded state of said loading/unloading means.

9. The apparatus according to claim 8, wherein said transfer means performs the data transfer if the loaded state is detected by said detecting means.

10. The apparatus according to claim 8, wherein said transfer means performs a data transfer from said first memory means to said second memory means if the loaded state is detected by said detecting means and predetermined conditions have been satisfied, and performs a data transfer from said second memory means to said first memory means if the loaded state is detected by said detecting means and the file information managed by said managing means corresponds to said second memory means.

11. The apparatus according to claim 6, further comprising updating means for updating each of the file information managed by said managing means in concurrent with execution of the data transfer by said transfer means.

12. A facsimile apparatus comprising:

first memory means for storing data, having a semiconductor memory;

second memory means for storing data, having a non-volatile memory;

managing means for managing status of storage of data in each said first and second memory means;

transfer means for performing a data transfer between said first and second memory means in accordance with each status of storage managed by said managing means;

loading/unloading means for loading said non-volatile memory in and unloading said non-volatile memory from said facsimile apparatus; and detecting means for detecting a loaded/unloaded state of said loading/unloading means, wherein said transfer means performs the data transfer from said first memory means to said second memory means if the loaded state is detected by said detecting means and predetermined conditions have been satisfied, and performs the data transfer from said second memory means to said first memory means if the loaded state is detected by said detecting means and information managed by said managing means corresponds to said second memory means, said predetermined conditions including time, and wherein said transfer means has a timer and determination means for determining, based on said timer, whether said predetermined conditions have been satisfied.

13. A method for storing a transmission image for facsimile transmission in a plurality of memories, including at least a semiconductor memory for storing a first plurality of image data files and separate first file information and a non-volatile memory for storing a second plurality of image data files and separate second file information different from the first file information, in a facsimile apparatus, comprising:

a loading/unloading step of loading the non-volatile memory in and unloading the non-volatile memory from said facsimile apparatus;

a managing step of managing the first plurality of files by using the first file information and managing the second plurality of filed by using the second file information; and a transferring step of transferring a transmission image data file previously stored in the semiconductor memory to the non-volatile memory in accordance with the first and second file information.

14. The method according to claim 13, further comprising a detecting step of detecting a loaded/unloaded state at said loading/unloading step.

15. The method according to claim 14, wherein at said transferring step, whether predetermined conditions have been satisfied is verified and the data transfer from the semiconductor memory to the non-volatile memory is performed if the loaded stated is detected at said detecting step and a predetermined time has arrived, and whether said predetermined conditions have been satisfied is verified and the data transfer from the non-volatile memory to the semiconductor memory is performed if the loaded state is detected at said detecting step and said managing step is currently managing the second file information.

16. A method for storing a plurality of image data files for facsimile transmission in first and second memories in a facsimile apparatus, comprising the steps of:

storing, in the first memory, first file information for managing a first plurality of image data files stored in the first memory;

storing, in the second memory, second file information, different from the first file information, for managing a second plurality of image data files stored in the second memory; and performing a data transfer of an image data file between said first and second memories in accordance with the first and second file information.

17. The method according to claim 16, wherein the first memory is a semiconductor memory and the second memory is a non-volatile memory.

18. The method according to claim 17, further comprising:

a loading/unloading step of loading the non-volatile memory in and unloading the non-volatile memory from the facsimile apparatus; and a detecting step of detecting a loaded/unloaded state at said loading/unloading step.

19. The method according to claim 18, wherein at said transferring step, the data transfer is performed if the loaded state is detected at said detecting step.

* * * * *

UNITED STATES PATENT AND TRADEMARK OFFICE
CERTIFICATE OF CORRECTION

PATENT NO. : 5,537,218

DATED : July 16, 1996

INVENTOR : TSUNEO NEGI

It is certified that error appears in the above-identified patent and that said Letters Patent is hereby corrected as shown below:

COLUMN 5

Line 63,   "step 4-2" should read --step S4-2--.

COLUMN 6

Line 12,   "step 4-6" should read --step S4-6--;
  Line 14,   "step 4-1" should read --step S4-1--;
  Line 16,   "step 4-1" should read --step S4-1--;
  Line 30,   "controller 31," should read --controller 4,--;
  Line 57,   "step 5-4" should read --step S5-4--.

COLUMN 8

Line 19,   "image 21" should read --image data 21--.

COLUMN 9

Line 14,   "condition" should read --conditions--;
  Line 25,   "semiconductor" should read --a semiconductor--;
  Line 50,   "an" should read --and--.

UNITED STATES PATENT AND TRADEMARK OFFICE
CERTIFICATE OF CORRECTION

PATENT NO. : 5,537,218

DATED : July 16, 1996

INVENTOR : TSUNEO NEGI

It is certified that error appears in the above-identified patent and that said Letters Patent is hereby corrected as shown below:

COLUMN 10

Line 26, "concurrent" should read --concurrence--.

COLUMN 11

Line 6, "filed" should read --files--;
   Line 19, "stated" should read --state--.

Signed and Sealed this

Tenth Day of December, 1996

Attest:

BRUCE LEHMAN

Attesting Officer     Commissioner of Patents and Trademarks